United States Patent [19]
Ogura

[11] Patent Number: 5,544,244
[45] Date of Patent: Aug. 6, 1996

[54] METHOD FOR PROTECTING AN ENCIPHERED COMPUTER OBJECT CODE AGAINST CRYPTANALYSIS

[75] Inventor: Naoyuki Ogura, Tokyo, Japan

[73] Assignee: NEC Corporation, Tokyo, Japan

[21] Appl. No.: 330,568

[22] Filed: Oct. 28, 1994

[30] Foreign Application Priority Data

Oct. 28, 1993 [JP] Japan ................................. 5-270718

[51] Int. Cl.$^6$ ....................................................... H04L 9/00
[52] U.S. Cl. ................................................. 380/4; 380/49
[58] Field of Search ................................. 380/4, 3, 49, 28

[56] References Cited

U.S. PATENT DOCUMENTS

| | | | |
|---|---|---|---|
| 4,864,494 | 9/1989 | Kobus | 380/4 |
| 5,081,675 | 1/1992 | Kittirutsunetorn | 380/4 |
| 5,182,770 | 1/1993 | Medveczky, et al. | 380/4 |

*Primary Examiner*—David C. Cain
*Attorney, Agent, or Firm*—Whitham, Curtis, Whitham & McGinn

[57] ABSTRACT

In order to transform enciphered instructions stored in an external memory into the original ones while a microcomputer executes the same, the instructions have been enciphered and stored in the memory such as to be logically partitioned into a plurality of groups. The enciphered instructions are read out of the memory for decipherment. A first instruction located at an initial storage address of a group is initially deciphered using a first value. Thereafter, the following instructions in the group are sequentially deciphered using a second value which is determined by transforming an immediately preceding instruction. If the microcomputer executes a branch instruction, the execution control is transferred to a branched address. Subsequently, a first instruction located at the group, which includes the branched address, is deciphered using the first value. Thereafter, the instruction(s) following the first instruction are deciphered, using the second value, until deciphering an instruction stored at the branched address.

8 Claims, 12 Drawing Sheets

LOOKUP
TABLE

| 0000→1010 | 1000→1011 |
| 0001→0101 | 1001→1101 |
| 0010→0011 | 1010→0100 |
| 0011→0111 | 1011→1001 |
| 0100→0010 | 1100→0000 |
| 0101→1110 | 1101→0110 |
| 0110→1100 | 1110→1000 |
| 0111→1111 | 1111→0001 |

METHOD FOR PROTECTING AN ENCIPHERED COMPUTER OBJECT CODE AGAINST CRYPTANALYSIS

BACKGROUND OF THE INVENTION

1. Field of the Invention

The present invention relates generally to a method for rendering it difficult to break a computer object code which has been enciphered and stored in an external memory, and more specifically to such a method for transforming the enciphered computer object code into the original one while executing the same.

2. Description of the Related Art

In digital data processing systems, it is a common practice to utilize cryptographic techniques in order to prevent an unauthorized access to proprietary secret data. Data to be protected is transformed into the corresponding ciphertext. The ciphertext, when it is to be used, is subject to the reverse process via which the ciphertext is transformed into the original data (viz., plaintext).

A cipher is a secret method of writing whereby plaintext (or cleartext) is transformed into the corresponding ciphertext (sometimes called a cryptogram). The process is called encipherment or encryption, while the reverse process of transforming ciphertext into the corresponding plaintext is called decipherment or decryption.

Before turning to the present invention it is deemed preferable to discuss, with reference to FIGS. 1–6, a cryptographic technique relevant to the present invention.

FIG. 1 is a block diagram schematically showing a data transmission system wherein data to be transmitted is subject to encipherment and the data received is transformed into the original data.

The system shown in FIG. 1 generally includes two transceivers 10a and 10b which are interconnected via a transmission channel 12. It is to be noted that the transceivers 10a and 10b are not shown in a complete manner for the sake of simplifying the disclosure. The transceiver 10a includes an encipherment circuit 14a, a decipherment circuit 16a, and a duplexer 18a. Similarly, the transceiver 10b includes an encipherment circuit 14b, a decipherment circuit 16b, and a duplexer 18b.

The encipherment circuit 14a transforms the data to be transmitted into the corresponding ciphertext. The enciphered data is then forwarded to the transceiver 10b whereat the transmitted data is reverse processed for obtaining the corresponding plaintext at the decipherment circuit 16b.

Similarly, the encipherment circuit 14b enciphers the data to be transmitted. The enciphered data is sent to the transceiver 10a wherein the transmitted data is subject to decipherment and thus transformed into the corresponding plaintext at the decipherment circuit 16a.

FIG. 2 is a block diagram schematically showing one example of the encipherment circuit 14a. The other encipherment circuit 14b is configured in exactly the same manner as the circuit 14a.

As shown in FIG. 2, the encipherment circuit 14a includes a memory 20 in which a lookup table is stored, a selector 22, a memory 24 in which an initial value (code) is stored, a controller 26, a latch 28, and an exclusive-OR gate 30. The memory 20 typically takes the form of ROM (read only memory) in which a lookup table such as depicted in FIG. 3 is stored.

In order to simplify the instant disclosure, each data to be transmitted has a bit length of 4.

FIG. 4 is an illustration showing encipherment being implemented at the encipherment circuit 14a of FIG. 2, using the lookup table of FIG. 3.

It is assumed that a data sequence applied in series to the encipherment circuit 14a is depicted by "1001", "1110", "0011", "1001", "0101", "0000", "1000", "0111", . . . as shown in FIG. 4. Further, it is assumed that the initial value is set to "1101".

When the first original data "1001" is applied to the exclusive-OR gate 30, the controller 26 issues selector and latch control signals each of which assumes a logic level "1" (for example). The selector 22, in response to a logic level "1" of the selector control signal, selects the initial value "1101". Thus, the latch 28 keeps the initial value "1101" and applies same to the exclusive-OR gate 30 in response to the latch control signal assuming a logic level "1". Therefore, the exclusive-OR gate 30 outputs a transformed data (viz., enciphered data) "0100". The above mentioned operations are implemented within one time slot.

During the above operations, the first data is applied to the lookup table 20 from which the corresponding data "1101" is outputted as shown in FIG. 4.

When the second original data "1110" is fed to the exclusive-OR gate 30, the controller 26 issues the selector control signal which in turn assumes a logic level "0". The selector 22, in response to the selector control signal, selects the output of the memory 20 (viz., "1101") which is latched and then applied to the exclusive-OR gate 30. The second original data "1110" is thus transformed into "0011" at the exclusive-OR gate 30 as shown in FIG. 4. These operations are implemented within one time slot. Encipherment of the incoming data are repeated until one data sequence is terminated.

FIG. 5 shows the decipherment circuit 16b in schematic block diagram form. Since decipherment is a reverse process of encipherment, the arrangement of FIG. 5 is similar to that of FIG. 2. Therefore, each of the function blocks of FIG. 5, which corresponds to the counterpart of FIG. 2, is designated by the same numeral with a prime.

The operation of FIG. 5 arrangement is discussed with reference to FIG. 6. The data sequence enciphered at the transceiver 10a is applied to the decipherment circuit 16b. That is, the data sequence is comprised of "0100", "0011", "1011", "1110", "1000", "1110", "0010", "1100", . . . as shown.

When the first enciphered data "0100" is applied to the exclusive-OR gate 30' during a given time slot, the controller 26' issues a selector control signal and a latch control signal each of which assumes a logic level "1" (for example). The selector 22', in response to a logic level "1" of the selector control signal, selects the initial value which is identical to the initial value used in the encipherment (viz., "1101"). The latch 28 latches the initial value "1101" in response to the latch control signal assuming a logic level "1". Thus, the initial value "1101" is applied to the exclusive-OR gate 30' which in turn outputs the corresponding original data "1001". These operations are carried out during one time slot.

Subsequently, at the next time slot, the original data deciphered is applied to the memory 20' which has previously stored the same lookup table as shown in FIG. 3. Thus, the data "1101" is obtained from the memory 20'. During the same time slot, the second deciphered data "0011" is applied to the exclusive-OR gate 30'. The controller 26' issues the selector control signal assuming a logic level "0". The selector 22' responds thereto and selects the output of the memory 20' (viz., "1101") which is latched and applied to the exclusive-OR gate 30'. Accordingly, the second enciphered data "0011" is transformed into the corresponding original data "1110" at the exclusive-OR gate 30'. The above mentioned operations are implemented during one time slot. Following this, the decipherment circuit 16b continues to decipher the incoming deciphered data up to the completion of the decipherment of one data sequence.

With the above mentioned related art, each data of the sequence, except for the initial one, is enciphered or deciphered using the immediately preceding one. Therefore, even if the initial value is known an unauthorized person(s), breaking the cipher is extremely difficult as long as the content of the lookup table is kept secret.

However, even though decipherment of the transmitted data is efficient if implemented sequentially (viz., using the immediately preceding data), the above mentioned related art does not lead to the decipherment of computer object code while concurrently executing the object code because almost every computer program involves one or more branch (or jump) instructions. As a result, there has been no proposal thus far for deciphering computer object code during the execution thereof.

SUMMARY OF THE INVENTION

It is an object of the present invention to provide an arrangement for effectively protecting computer object code against cryptanalysis.

Another object of the present invention is to provide a method for effectively protecting computer object code against cryptanalysis.

In brief, the above objects are achieved by the techniques wherein in order to transform enciphered instructions stored in an external memory into the original ones while a microcomputer executes the same, the instructions have been enciphered and stored in the memory such as to be logically partitioned into a plurality of groups. The enciphered instructions are read out of the memory for decipherment. A first instruction located at an initial storage address of a group is initially deciphered using a first value. Thereafter, the following instructions in the group are sequentially deciphered using a second value which is determined by transforming an immediately preceding instruction. If the microcomputer executes a branch instruction, the execution control is transferred to a branched address. Subsequently, a first instruction located at the group, which includes the branched address, is deciphered using the first value. Thereafter, the instruction(s) following the first instruction are deciphered, using the second value, until deciphering an instruction stored at the branched address.

A first aspect of the present invention resides in a method of sequentially enciphering a plurality of instructions of a computer object code, the enciphered instructions being stored in a memory, the method comprising the steps of: enciphering, using a first value, each of first instructions if the first instruction is supplied for encipherment, the plurality of first instructions being separately located, in the computer object code, away from an adjacent first instruction by a predetermined number of instructions; and enciphering, using a second value, each of a plurality of instructions other than the first instructions, the second value being determined by transforming an immediately preceding instruction.

A further aspect of the present invention resides in a method of deciphering a plurality of instructions stored in an external memory after being enciphered, the plurality of instructions having being logically partitioned into a plurality of groups in the external memory, deciphered instructions being applied to a microcomputer and executed therein, the method comprising the steps of: reading one by one the plurality of instructions from the external memory; deciphering, using a first value, a first instruction located at an initial storage address of a group; deciphering, using a second value, each of a plurality of instructions other than the first instruction, the second value being determined by transforming an immediately preceding instruction; branching to a storage address defined by a branch instruction when the microcomputer has executed the branch instruction; deciphering, using the first value, a first instruction located at an initial storage address of a particular group which includes the branched storage address; and deciphering, using the second value, one or more than one instructions until deciphering an instruction stored at the branched storage address.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

The present invention is directed to transformation of enciphered computer object code, stored in an external memory, into original code while concurrently executing the code in a microcomputer (or CPU (central processing unit)). Thus, even if the enciphered code is illegally duplicated, it is actually infeasible to break the cipher without knowing the encipherment exhibited by the microcomputer. The external memory takes the form of a RAM (random access memory), a hard disk, a floppy disc, etc.

Figure 7:
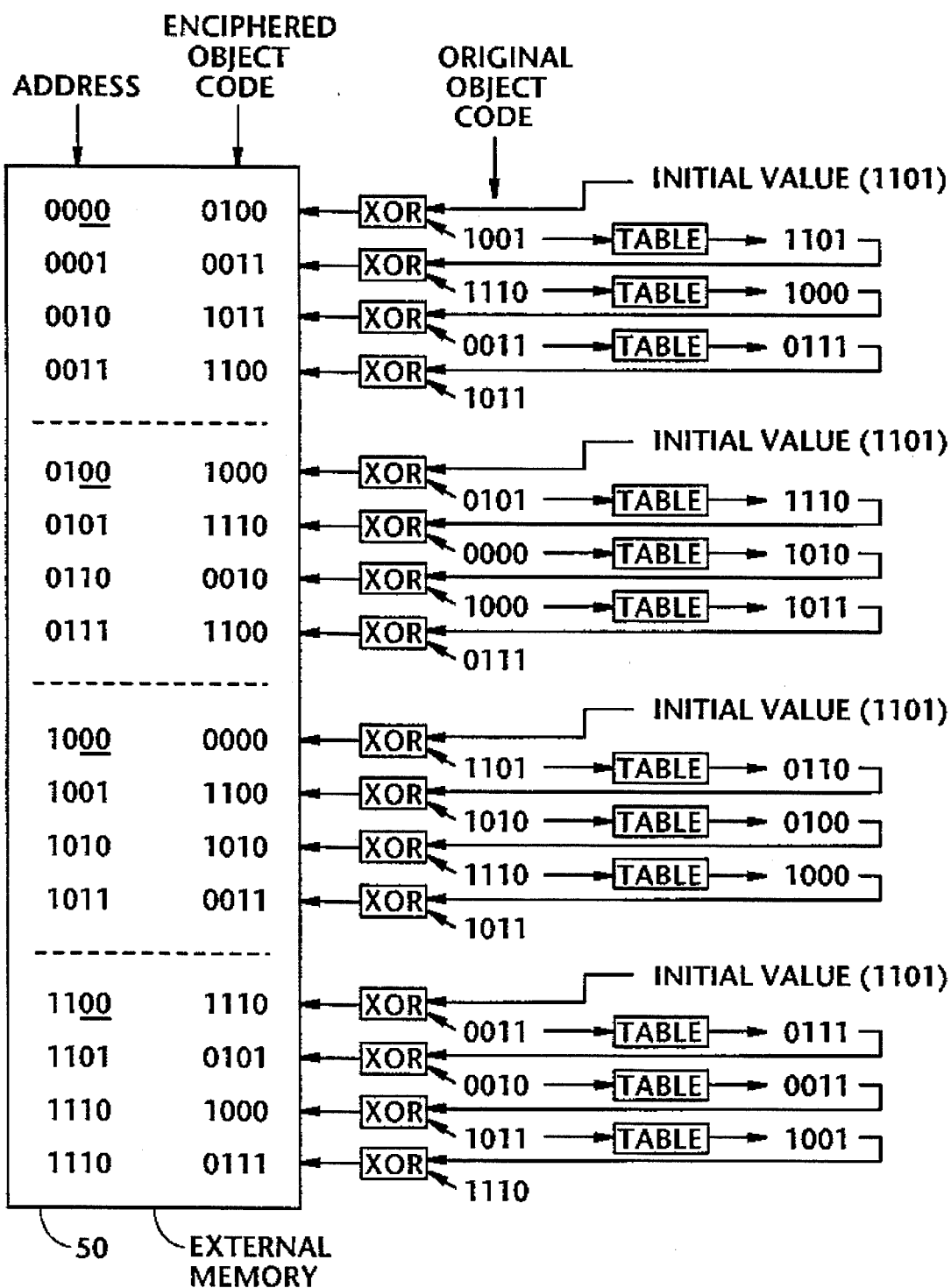
FIG. 7 is an illustration showing a principle underlying encipherment according to a first embodiment of the present invention.

Before turning to the first embodiment of the present invention, it is deemed preferable to discuss, with reference to FIG. 7, a principle underlying the encipherment according to the first embodiment.

Figure 1:
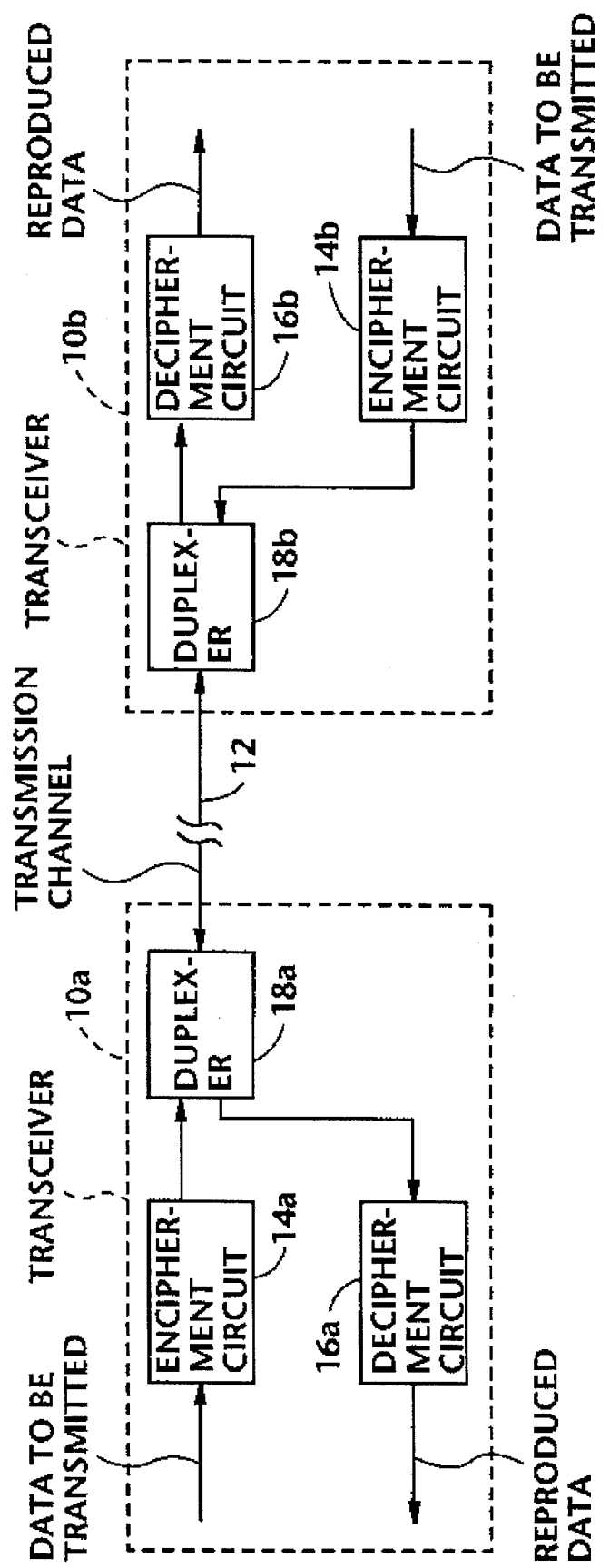
FIG. 1 is a block diagram schematically showing related art for encipherment and decipherment of data sequence in a digital communications system, referred to in the opening paragraphs of the instant disclosure.
Figures 2, 3:
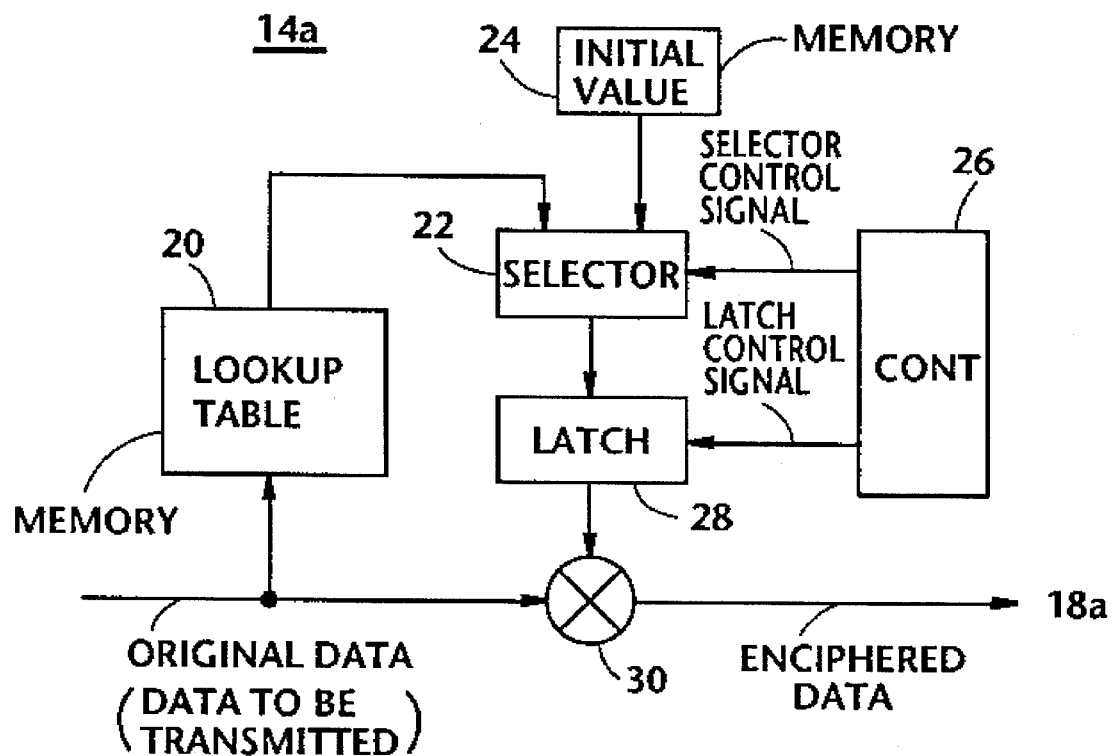
FIG. 2 is a block diagram showing one function block of FIG. 1 in detail.
FIG. 3 is a lookup table for use in the encipherment and decipherment of the related art of FIG. 1, and which is referred to during the discussion of the present invention.
Figure 4:
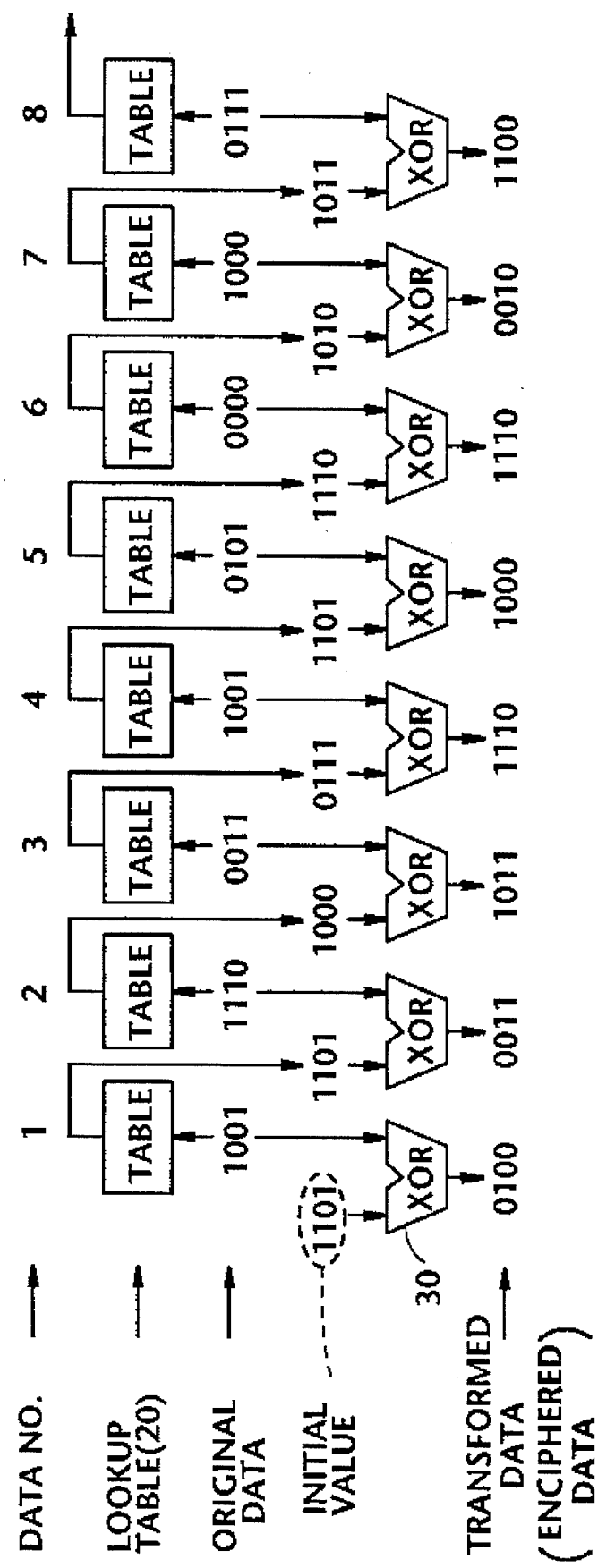
FIG. 4 is a diagram describing the encipherment of the related art of FIG. 1.
Figure 6:
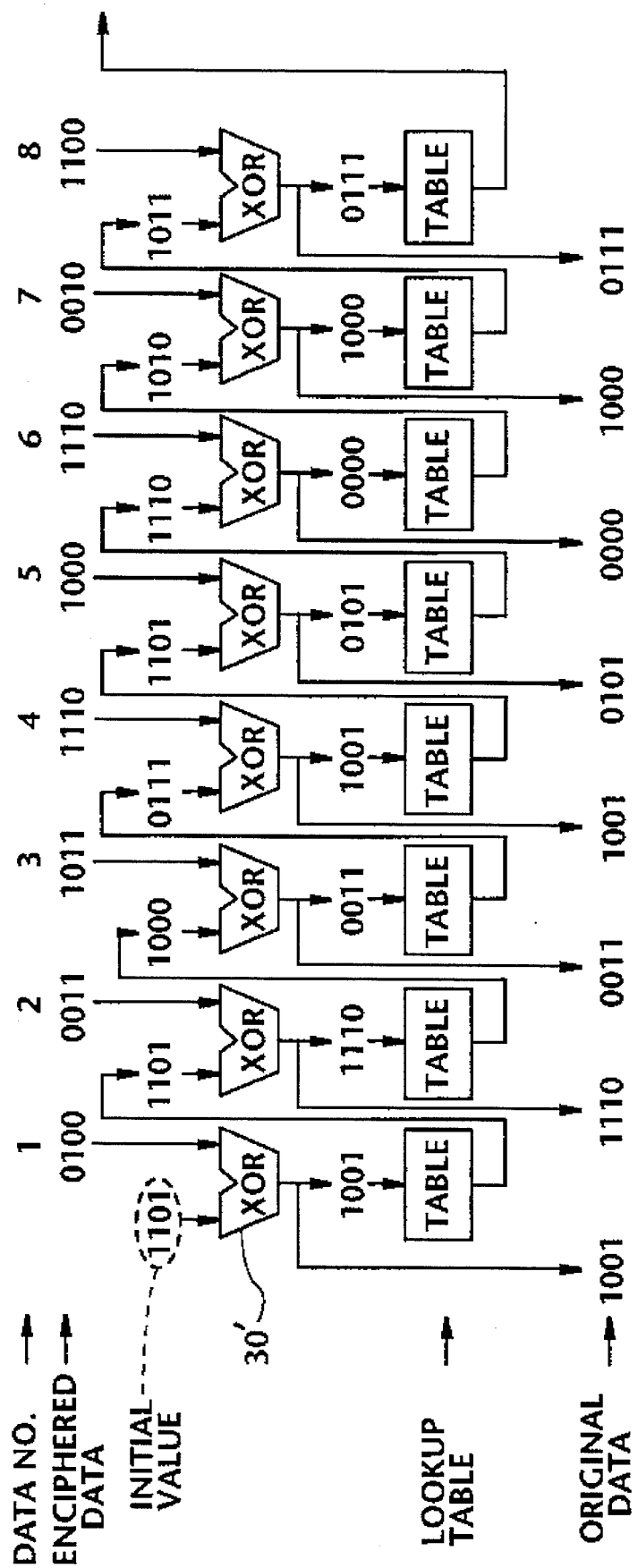
FIG. 6 is a diagram describing the decipherment of the related art of FIG. 1.

For the sake of convenience, the data shown in FIGS. 4 and 6 are used as machine language instructions in discussing the present invention. Further, for the sake of convenience, the initial value "1101" referred to in the opening paragraphs and the lookup table of FIG. 3 are used in the discussion of the present invention.

In FIG. 7, reference numeral 50 depicts an external memory. It is assumed, as in the related art, that each instruction of the object code has a bit length of 4 and that each storage address has also a bit length of 4. As shown, the enciphered object code is equally divided or partitioned into four instruction sequences in this particular case.

According to the present invention, an initial value is periodically used when the object code is enciphered before being stored into the external memory 50. In more specific terms, during the encipherment, the initial value is used each time a predetermined number of lower bits of the storage address exhibits the same value (all zeros for example).

As shown in FIG. 7, the predetermined number of lower bits of the storage address is set to two (2) as highlighted by underline. Therefore, the object code is equally divided into four instruction sequences each of which includes four (i.e. $2^2$) instructions.

Except for the periodic usage of the initial value, the present invention is substantially identical with the related art in terms of encipherment.

An exclusive-OR gate, depicted by XOR, is supplied with the initial value "1101" and the first instruction "1001" and outputs an enciphered instruction "0100" which is stored in the external memory 50 at the storage address "00<u>00</u>". This process is identical to the encipherment of the first data discussed in connection with FIG. 4. The following three instructions are enciphered in exactly the same manner as discussed in the opening paragraphs with FIG. 4. That is, the instructions "1110", "0011" and "1011" are respectively transformed into the corresponding enciphered ones "0011", "1011" and "1100" using the exclusive-OR gate and the lookup table shown in FIG. 3.

The fifth instruction "0101" is to be stored at a location defined by the storage address "0100" and thus, the fifth instruction is subject to encipherment using the initial value "1101" as illustrated. The enciphered fifth instruction (viz., "1000") is stored at the location indicated by the address "0100". The subsequent encipherment can readily be appreciated and accordingly, further description thereof is omitted for brevity.

Unlike the above discussion, if the object code is sequentially stored beginning with the storage address "00<u>01</u>" (for example), the initial value "1101" is used for instruction encipherment each time an instruction needs to be stored at the address whose lower two bits exhibits "<u>01</u>".

The above discussion can be extended to the case where the storage address has a bit length more than 4. In such a case, the encipherment using the initial value should be carried out at the n-th power of 2 (=$2^n$) where n≧3 and corresponds to the number of lower bits of the storage address to be used.

Figure 8:
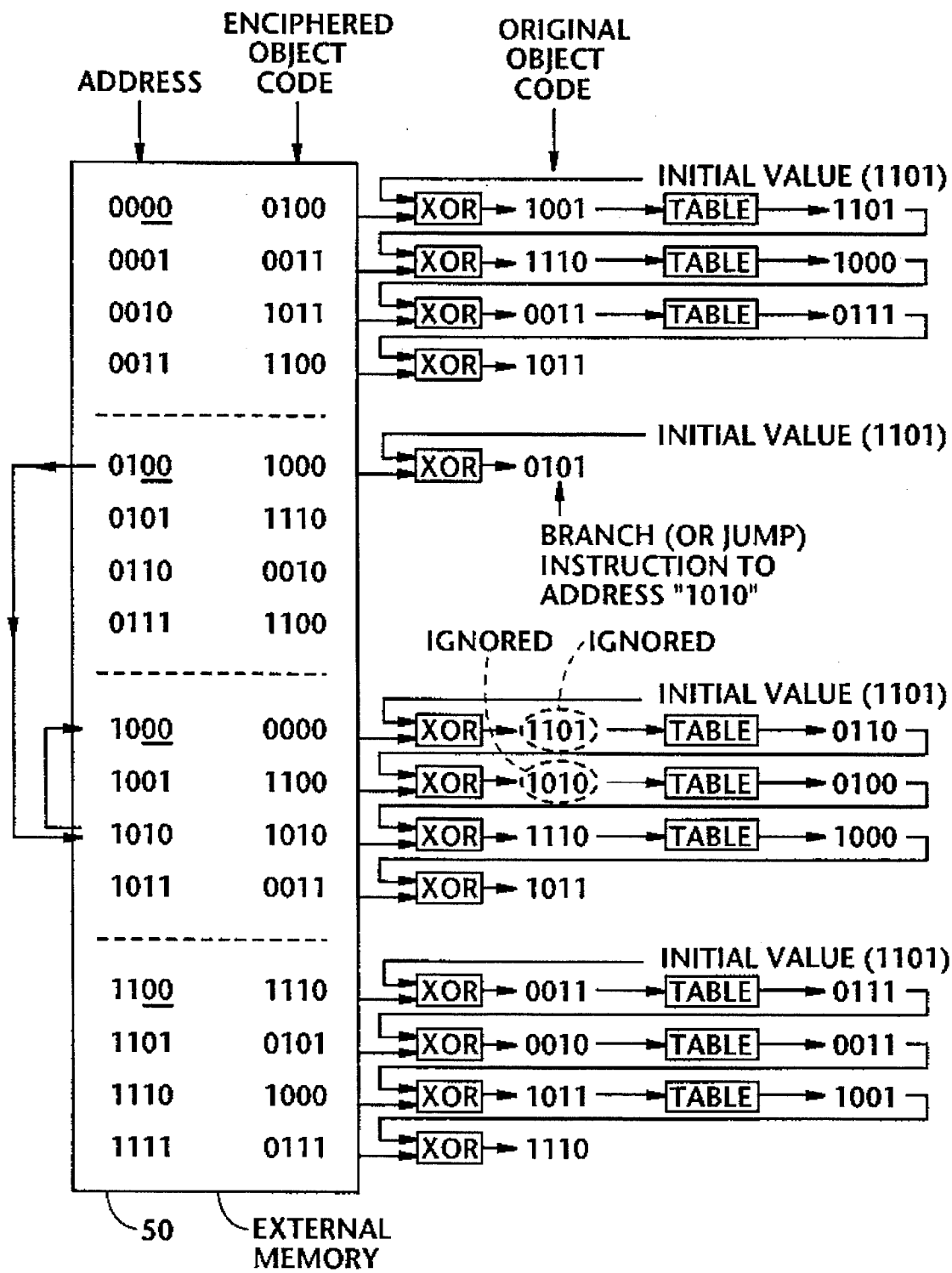
FIG. 8 is an illustration showing a principle underlying decipherment according to the first embodiment.

Referring to FIG. 8, a principle underlying decipherment of the first embodiment is given in an illustrated manner.

The original object code has been enciphered in a manner which periodically uses the initial value, the reverse process should be implemented in order to transform the enciphered object code into the original one. According to the present invention, the original code can be precisely obtained even if a branch instruction is encountered while executing the code.

As shown in FIG. 8, the first four instructions (viz., "0100", "0011", "1011" and "1100"), which has been enciphered and stored in the external memory 50, are deciphered in the same manner as in the related art.

It is assumed that the enciphered instruction "1000" stored at the address "0100" is a branch (or jump) instruction which transfers program control to the address "1010" as shown in FIG. 8. When the microcomputer detects that the deciphered instruction "0101" is the branch instruction, the lower 2 bits of the destination address (viz., "1010") are rendered zeros. Thus, the stored instruction "0000" at the address "1000" is transformed into the original instruction "1101" using the initial value "1101". Thereafter, the stored instruction "1100" at the address "1001" is deciphered into the original instruction "1010". However, these two instructions "1101" and "1010" (indicated in chain line enclosures) are redundant and thus, these two instructions are ignored or disregarded. Following this, the enciphered instruction "1010" is transformed into the original one "1110" whereby the normal program execution resumes.

In summary, the first embodiment is to make available the above mentioned advantage using the following techniques. Firstly, the first code of each blocked instructions is enciphered using the initial value along the algorithm as discussed above. Secondly, when the program jumps to a certain address, the decipherment is implemented from the first address of the divided instruction sequence which includes the address to which the program execution is transferred.

It appears that the hardware arrangement of the first embodiment can be realized without undue difficulty if the above mentioned principles are available.

Figure 9:
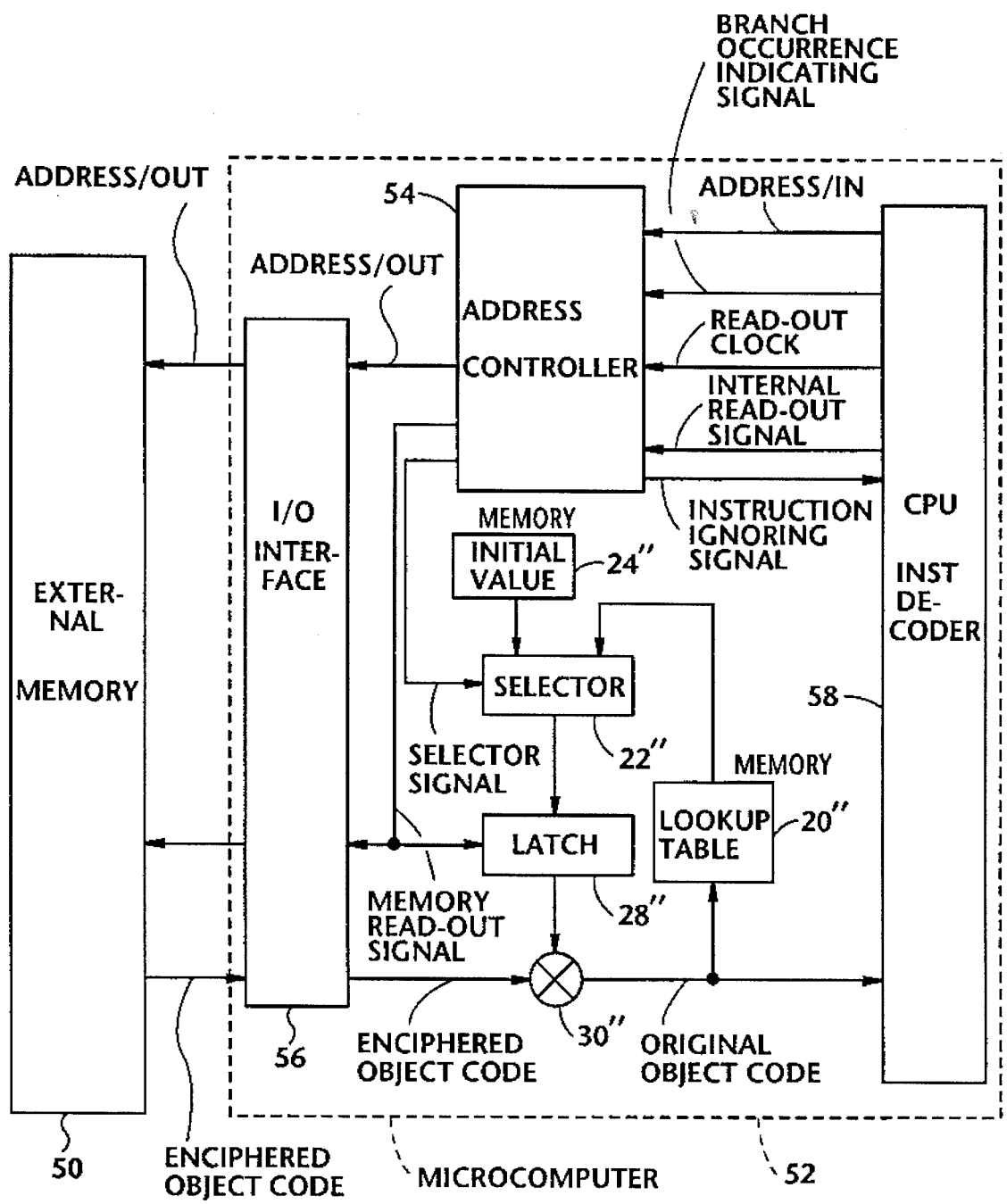
FIG. 9 is a block diagram showing the first embodiment of the present invention.
Figure 10:
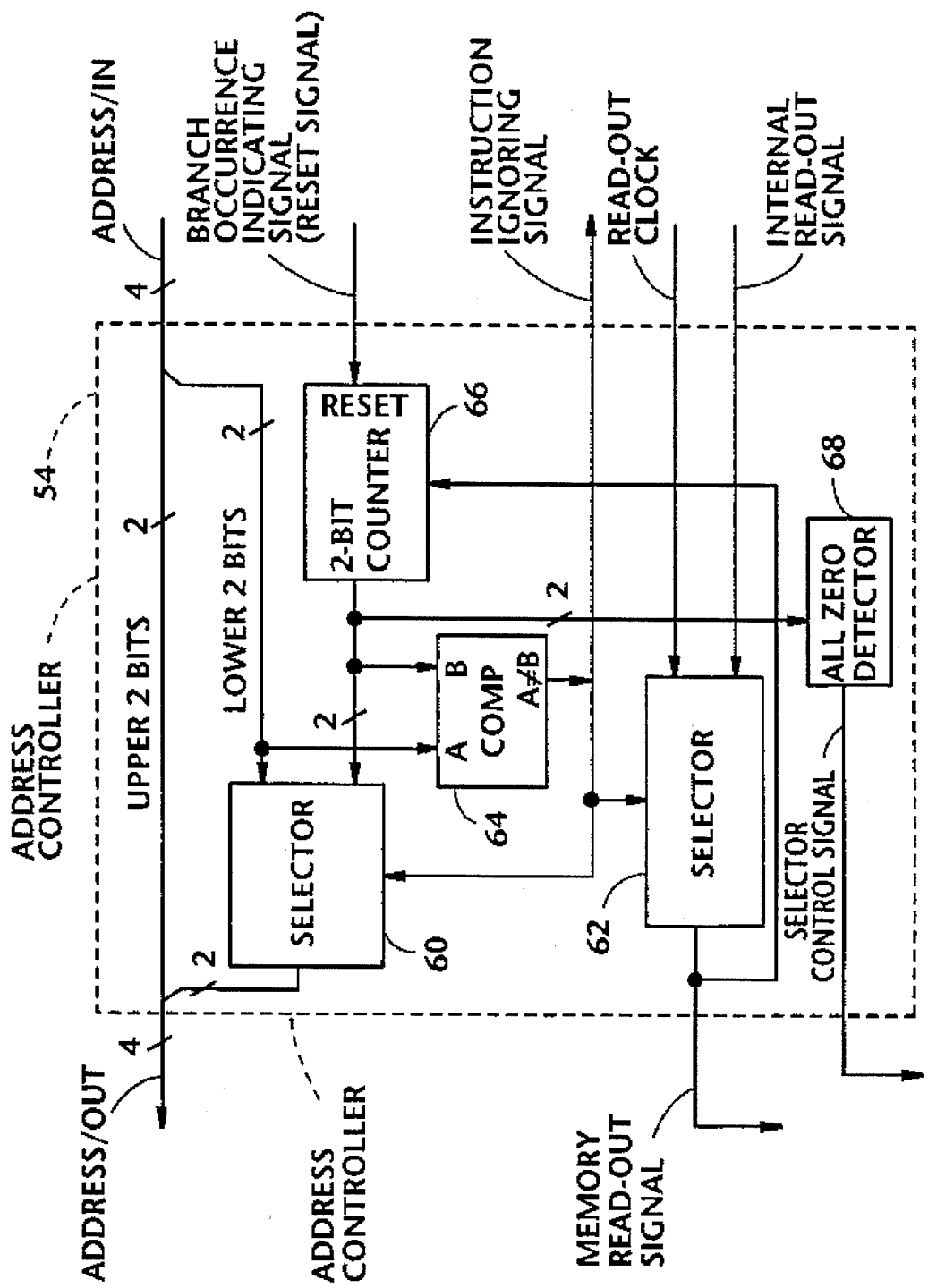
FIG. 10 is a block diagram showing one block of FIG. 9.
Figure 11:
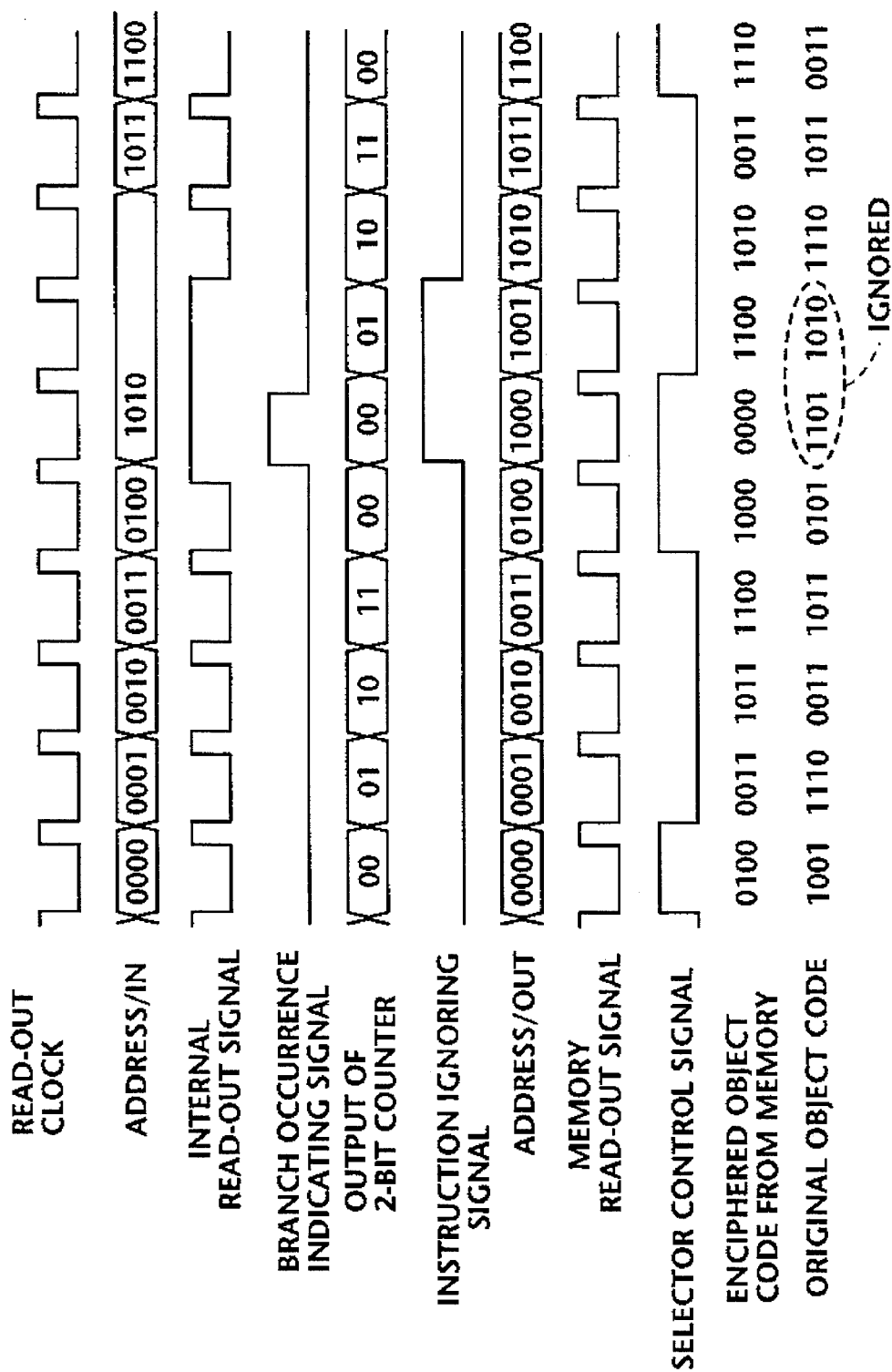
FIG. 11 is a timing chart which characterizes the operation of the first embodiment.

FIG. 9 is a block diagram showing the decipherment arrangement according to the first embodiment, while FIG. 10 shows in detail an address controller 54 of FIG. 9. On the other hand, FIG. 11 is a timing chart which characterizes the operations of the arrangements of FIGS. 8–10.

The arrangements of FIGS. 9 and 10 are to realize the principle referred to in connection with FIG. 8.

Figure 5:
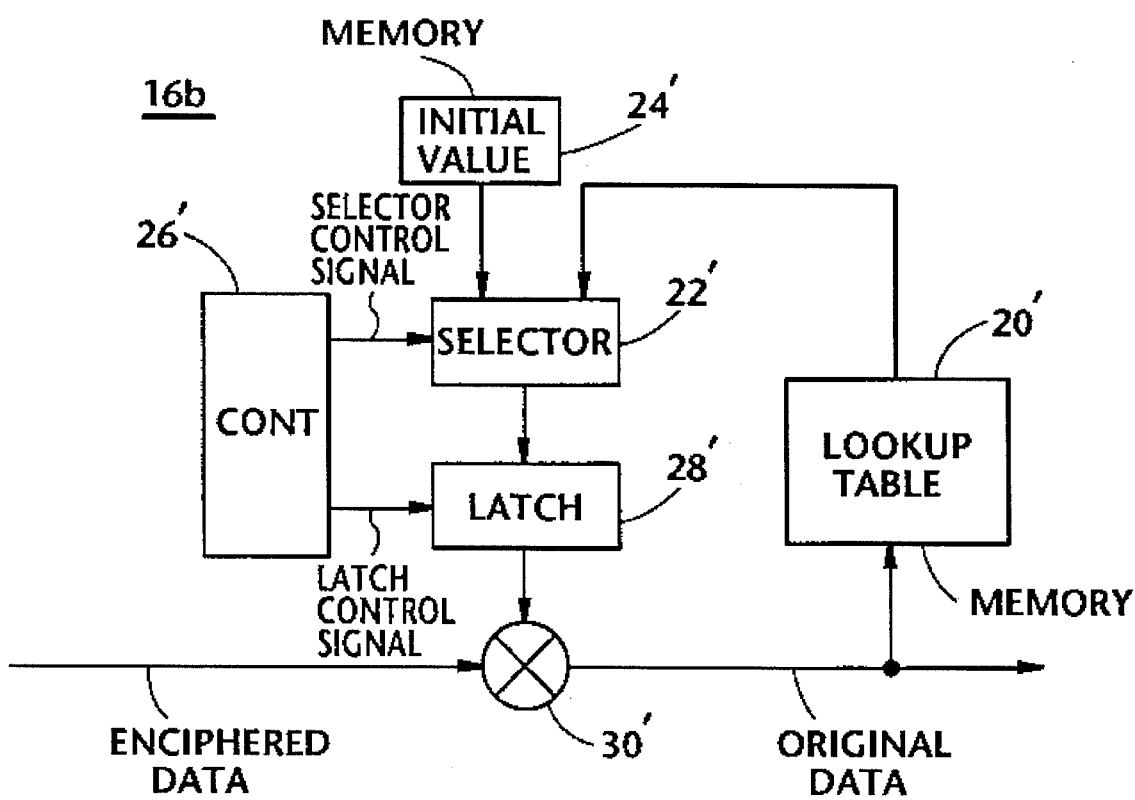
FIG. 5 is a block diagram showing a function block of FIG. 1 in detail.

As shown in FIG. 9, the external memory 50, which has been referred to in FIGS. 7 and 8, is operatively coupled to a microcomputer 52. The microcomputer 52 generally includes, in addition to the address controller 54, an I/O (input/output) interface 56, and a plurality of blocks 58, 20", 22", 24", 28" and 30". The block 58 is comprised of CPU and an instruction decoder (neither shown). The block 58 will be referred to as CPU 58 for the convenience of discussion. The other blocks 20", 22", 24", 28" and 30" correspond to the counterparts 20', 22', 24', 28' and 30' of FIG. 5, respectively.

It is assumed that the external memory 50 has already stored the enciphered instructions as shown in FIGS. 7 and 8.

As mentioned above, FIG. 10 is prepared to realize the principle referred to in connection with FIG. 8.

As shown in FIG. 10, the address controller 54 includes two selectors 60 and 62, a comparator 64, a 2-bit counter 66, and an all-zero detector 68.

The storage address applied from the CPU 58, whose bit length is 4, is spit into the upper and lower 2 bits. The lower 2 bits are applied to the selector 60 and the comparator 64. The 2-bit counter 66 counts from "00" up to "11" in response to a memory read-out signal applied thereto from the selector 62. The 2-bit counter 66 is reset when receiving a branch occurrence indicating signal from the CPU 58. When the 2-bit counter 66 generates all zeros (viz., "00" in the instant case), the detector 68 issues a selector control signal which renders the selector 22" (FIG. 9) to select the initial value. It is to be noted that the output of the 2-bit counter 66 is synchronized or coincides with the lower 2 bits of each instruction before executing a branch instruction and after having branched to an instructed address. If the comparator 64 determines that the output of the 2-bit counter 66 does not coincide with the lower 2 bits, then the comparator 64 applies an instruction ignoring signal to the CPU 58. This signal is also applied to the selectors 60 ad 62 to change the selection of the applied signals.

The timing chart of FIG. 11 will briefly be explained with reference to FIGS. 8–10.

In FIG. 11, the read-out clock is used to synchronize the internal read-out signal and the memory read-out signal. While the instruction ignoring signal (or busy signal) is generated, the CPU 58 terminates the internal read-out signal as shown in FIG. 11. However, the memory read-out signal needs to be applied to the external memory 50. This is the reason why the selector 62 responds to the instruction ignoring signal and selects the read-out clock. Most of the operations have already been discussed and hence, further descriptions of FIG. 11 are deemed redundant and accordingly omitted for simplifying the instant disclosure.

Figure 12:
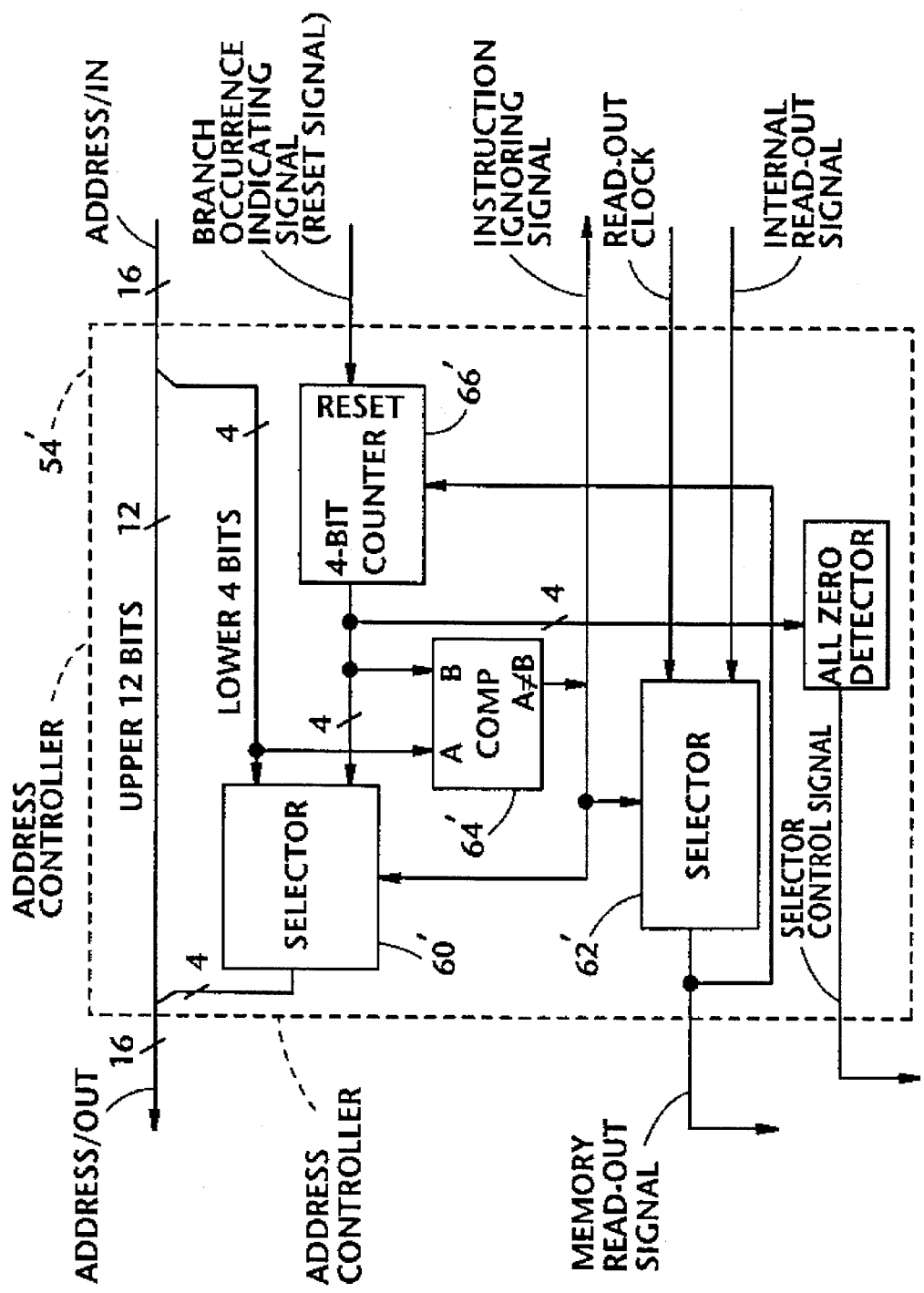
FIG. 12 is a block diagram showing one block of FIG. 9 which is used for processing storage address with a 16 bit length.

FIG. 12 is a block diagram showing a variant (depicted by 54') of the address controller 54. The controller 54' is configured to handle addresses having a bit length of 16. Each blocks of FIG. 12 are denoted by numeral attached to the counterpart of FIG. 10 plus a prime. The arrangement of FIG. 12 is used to transform computer object code which has been enciphered using the initial value every 16 instructions. Therefore, the lower 4 bits of the address applied to the address controller 54 is split from the total 16 bits. Further, the arrangement of FIG. 12 includes 4-bit counter 66' instead of the 2-bit counter of FIG. 10. Description of FIG. 12 is omitted in that it is believed to be self-explanatory in light of the above description pertaining to the arrangement shown in FIG. 10.

Figure 13:
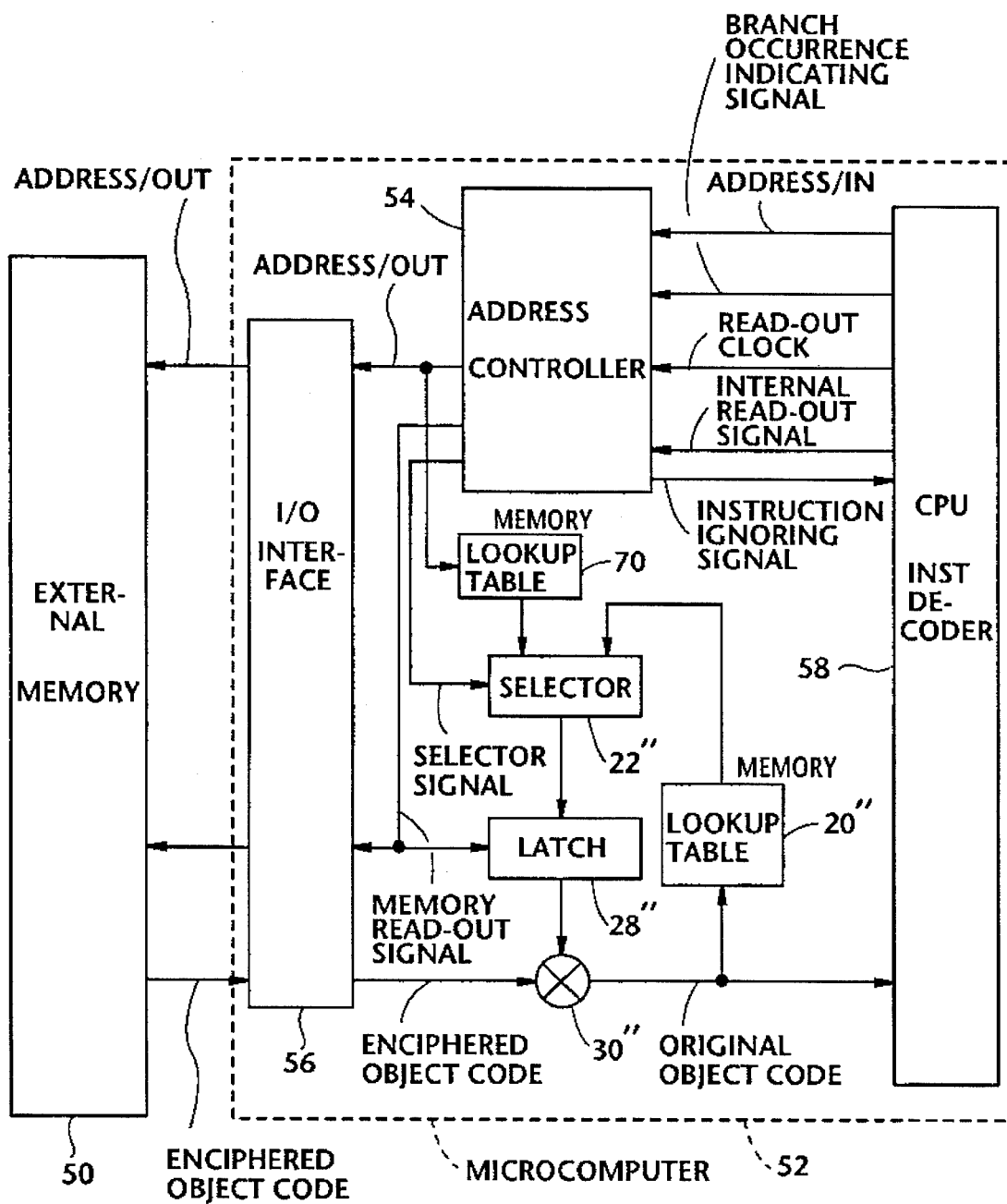
FIG. 13 is a block diagram showing a second embodiment of the present invention.

FIG. 13 is a block diagram showing a second embodiment of the present invention.

The arrangement of FIG. 13 differs from that of FIG. 9 in that the former arrangement includes a lookup table 70 in place of the memory 24" for storing the initial value. The lookup table 70 is supplied with the first address of each instruction sequence and outputs the corresponding value determined by the lookup table stored therein. In order to use the lookup table 70 for decipherment, it is necessary to encipher the original object code such that the first instruction of each of the instruction sequence is enciphered using a value (viz., the output of the lookup table 70) which is determined by part or all of the first address of each instruction sequence.

It will be understood that the above disclosure is representative of only two possible embodiments of the present invention and that the concept on which the invention is based is not specifically limited thereto.

What is claimed is:

1. A method of sequentially enciphering a plurality of instructions of a computer object code, the enciphered instructions being stored in a memory, said method comprising the steps of:

enciphering, using a first value, each of first instructions if the first instruction is supplied for encipherment, said plurality of first instructions being separately located, in said computer object code, away from an adjacent first instruction by a predetermined number of instructions; and enciphering, using a second value, each of a plurality of instructions other than said first instructions, said second value being determined by transforming an immediately preceding instruction.

2. A method as claimed in claim 1, wherein locations of said first instructions are defined by storage addresses having a predetermined number of lower bits.

3. A method as claimed in claim 1, wherein said first value has a predetermined bit length and varies depending on part of a storage address which indicates a memory location to which an enciphered first instruction is to be stored.

4. A method as claimed in claim 1, wherein said first value has a predetermined bit length and varies depending on an entire storage address which indicates a memory location to which an enciphered first instruction is to be stored.

5. A method of deciphering a plurality of instructions stored in an external memory after being enciphered, said plurality of instructions having being logically partitioned into a plurality of groups in said external memory, deciphered instructions being applied to a microcomputer and executed therein, said method comprising the steps of:

reading one by one said plurality of instructions from said external memory;

deciphering, using a first value, a first instruction located at an initial storage address of a group;

deciphering, using a second value, each of a plurality of instructions other than said first instruction, said second value being determined by transforming an immediately preceding instruction;

branching to a storage address defined by a branch instruction when said microcomputer has executed said branch instruction;

deciphering, using said first value, a first instruction located at an initial storage address of a particular group which includes the branched storage address; and deciphering, using said second value, one or more than one instructions until deciphering an instruction stored at the branched storage address.

6. A method as claimed in claim 4, wherein the initial addresses of said groups are defined by storage addresses having a predetermined value of lower bits.

7. A method as claimed in claim 5, wherein said first value has a predetermined bit length and varies depending on part of a storage address which indicates a memory location to which an enciphered first instruction is to be stored.

8. A method as claimed in claim 5, wherein said first value has a predetermined bit length and varies depending on an entire storage address which indicates a memory location to which an enciphered first instruction is to be stored.

* * * * *